United States Patent
De Rossi

[11] Patent Number: 6,050,686
[45] Date of Patent: Apr. 18, 2000

[54] DISMOUNTABLE ELASTIC SPECTACLE HINGE

[75] Inventor: Valentino De Rossi, Morbier, France

[73] Assignee: Chevassus S.A., Morez, France

[21] Appl. No.: 08/854,708

[22] Filed: May 12, 1997

[30] Foreign Application Priority Data

May 14, 1996 [FR] France .................................. 96 06246

[51] Int. Cl.[7] ................................................... G02C 5/22
[52] U.S. Cl. .............................. 351/153; 351/113; 16/228
[58] Field of Search ..................................... 351/111, 113, 351/114, 116, 119, 121, 153; 16/228

[56] References Cited

U.S. PATENT DOCUMENTS

| | | | |
|---|---|---|---|
| 1,504,212 | 8/1924 | Carlson | 351/121 |
| 4,153,347 | 5/1979 | Myer | 351/116 |
| 5,359,370 | 10/1994 | Mugnier | 351/153 |
| 5,627,608 | 5/1997 | Chao | 351/113 |

FOREIGN PATENT DOCUMENTS

| | | |
|---|---|---|
| 2 626 682 | 8/1989 | France . |
| 2 690 760 | 11/1993 | France . |
| 34 04 511 | 8/1985 | Germany . |
| C 44 21 309 | 6/1995 | Germany . |
| 90 01718 | 2/1990 | WIPO . |

*Primary Examiner*—Huy Mai
*Attorney, Agent, or Firm*—Henderson & Sturm LLP

[57] ABSTRACT

An elastic spectacle frame comprises, on one side, a male charnier consisting of one end of a rod (12) solid with the middle part of a transverse connecting hinge pin (14), and a bearing surface (26) facing at least each portion of the pin protruding from the rod. The pin and the bearing surface being normally biased towards one another in the longitudinal direction of the rod by an elastic biasing mechanism (20,30,32), but are selectively movable apart from one another against the action of the elastic biasing mechanism. On the other side, the hinge comprises a female charnier (42,52) having eyelets (45,55) whose periphery, against which the surface comes to bear, is in the form of a cam, wherein at least one of the eyelets has a radial passageway (46,56), and wherein the interstice (49,59) between the eyelets is at least as big as the rod (12). A passageway (46), at least as big as the rod (12) and directed facing the bearing surface (26), is provided in one of the two eyelets (45) of the female charnier (42). The interstice (59) between the eyelets (55) is at least as big as the diameter of the pin (14) and as the largest cross-sectional dimension of the rod, and a passageway (56) directed facing away from the bearing surface (26), and at least as big as the pin's diameter, is provided in each of the female charnier's two eyelets (55).

17 Claims, 6 Drawing Sheets

DISMOUNTABLE ELASTIC SPECTACLE HINGE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates to an elastic hinge for connecting a side arm to a front part of a pair of spectacles. When their arms are moved from their "open" position corresponding to wearing the spectacles, to their "closed" storage position, such elastic hinges produce a snapping effect; they moreover allow the arms to be moved apart elastically beyond their "open" position. Such hinges are greatly appreciated by the public, in particular due to the fact that they enable the spectacle frame, even if used extensively, to be held with the proper configuration, and also because the side arms bear against the temples with a reasonable pressure.

2. Description of the Prior Art

Generally speaking, an elastic hinge is made up on the one hand of a front hinge element (or charnier) solidly secured in the side lug of the front part and, on the other hand, a side hinge element connected by an elastic biasing mechanism to the end of the side arm, with a pin connecting the hinge elements.

A first known type of biasing mechanism, called the "slide" type, comprises a sliding part which is slidably mounted inside a casing arranged at (or fixed to) the end of the side arm, the protruding end of the sliding part carrying a male or female charnier. The other side charnier is cam-shaped and bears against the housing's mouth. In the sliding part is a longitudinal space housing a spring whose end bears against an abutment such as a shaft, pin or screw that passes through and is fixed with the casing. When the side arm is pivoted, the front charnier pushes back the casing, which causes the sliding piece to move out elastically. This type of elastic hinge is, for example, described in EP 0 091 573, FR 2 258 642, FR 1 511 263, EP 0 426 947 and FR 2 702 573.

In a second known type of biasing mechanism, called the "rod" type, the side charnier, usually of the male type, is arranged at the protruding end of central rod slidably mounted inside a housing provided in or attached to the end of the side arm. The female front charnier is cam-shaped and bears against the housing's mouth. A spring located around this central rod bears on one side against a thick end part of the rod and, on the other side, against a pin passing through this housing or against a restriction-forming abutment engaging into the inner face of the housing. When the side arm is pivoted, the front charnier pushes back this housing which causes the sliding piece to move out elastically. This type of elastic hinge is, for example, described in EP 0 340 161, FR 2 609 816, or FR 2 664 990.

A third type of elastic hinge, known as the "sheath" type, described in FR 2 517 080, comprises a male charnier provided directly at the end of the side arm and connected by a screw to a female charnier integral with the frame's front part. A sheath is slidably mounted on the side arm in the proximity of the male charnier. The front face of this sheath is pushed against the cam-shaped female charnier by a spring that is also arranged concentric to the side arm and bears by its rear against an abutment, such as a crimped ring or an adhesively-bonded sleeve, integral with this side arm. When the side arm is pivoted, the front charnier pushes back the sheath by compressing the spring.

These hinges have a drawback in their connecting pin, usually formed by a screw whose threads engage in a bore in one of two eyelets making up the female hinge: if the screw is too tight it is difficult to open the side arm; if it is loose, it can unscrew and become lost.

In this regard, from U.S. Pat. No. 1,504,212, FR 1 126 049, DE 34 04 511 and DE 44 21 309 hinges are known wherein the connection pin is an integral part of the male charnier, protruding perpendicularly from both sides.

The female charnier of the first document consists of a cylinder with an inverted T or L shaped slot leading into the upper edge. During assembly, the pin is inserted into the cylinder and the side arm is passed into the vertical part of the slot to then be pivoted in the horizontal part. To prevent dismantling of the hinge, a nut is screwed in a threaded part at the pin's lower end emerging under the cylinder. Unfortunately, this nut is as unreliable as traditional screws.

The pin of the male charnier of the second document has two flats, and the two eyelets of the female charnier each have a slot aligned with one another with a spacing corresponding to the thickness separating the two flats. These flats are angularly positioned so that they can only pass through the slots in one angular position, outside the angular play corresponding to the open or closed arm. As a result, to assemble and snap together the hinge, the side arm must be temporarily bended. This type of hinge is principally intended to be manufactured from molded plastic material, which necessitates making it of large dimensions.

In the fourth document's hinge, the two eyelets of the female charnier each also have an aligned slot, one being wider than the other. To snap together this hinge, it is required to pass the side arm or its tenon in the wider slot by a vertical by a vertical movement to insert it when this side arm is momentarily deflected to place it in an angular position external to its angular play between its open or closed position. In practice, this deflection is impractical for non-qualified personnel, and may also result in damage to the enveloping parts or decorative plates carried by the side arm.

Because of their large dimensions and difficulties in assembly, it is unreasonable to envisage that this type of snap-fit hinge could be combined with an elastic mechanism allowing a snap-effect between the open and closed positions, or an elastic displacement beyond the open position.

There are also known concealed joining hinges employing a ball and socket joint, i.e. a ball solid with the end of the side arm which is received in a spherical seat in a cavity in the front part's tenon. However, these hinges are inconvenient to assemble. Moreover, these hinges are also very difficult to manufacture and have reduced mechanical strength due to the fact that the solid connecting pin, which is at least as large as the hinge, is replaced by a small sphere. Premature wear of the seat risks leading to separation of the side arm from the frame.

BRIEF SUMMARY OF THE INVENTION

The object of the present invention is a spectacle hinge whose male charnier comprises an integrated transverse pin able to snap fit reliably in the female charnier whose structure is adapted to be compatible with an efficient elastic biasing mechanism.

Preferably, the constituent components of this hinge must be arranged such that the hinge is so relatively easy to assemble and dismantle that it is possible to envisage that the side arm can even be changed by the user, either in case of breakage, or regularly in order to choose the aesthetic appearance of the hinge's cover or of the colored coating of the side arm stem.

Also preferably, it must be possible to make such a hinge with small dimensions, in particular of metal, and it must be composed of the smallest possible number of simple-to-manufacture, robust and inexpensive components. Such a hinge must also be able to allow fitting of complementary decorative parts.

To offer extra wearing comfort, it is desirable that such a hinge be able to accommodate for additional pivoting of the side arm relative to the front part.

These objects are achieved in an elastic spectacle frame which comprises, in combination, on one side, for example on the side arm, a male charnier consisting of one end of a rod solid with the middle part of a transverse connecting hinge pin,
and a bearing surface facing at least each portion of the pin protruding from the rod,
the pin and the bearing surface being normally biased towards one another in the longitudinal direction of the rod by an elastic biasing mechanism, and being selectively movable apart from one another against the action of the elastic biasing mechanism; and On the other side, for example on the front part's tenon, a female charnier having eyelets whose periphery, against which the surface comes to bear, is in the form of a double cam, at least one of the eyelets having a radial passageway, and wherein the interstice between the eyelets is at least as big as the rod.

The radial passageway of the eyelet permits assembly of the male charnier in the female charnier when the pin comes to project from the end of the rod following a momentary withdrawal of the bearing surface over the bearing surface along this rod against the action of the elastic biasing mechanism. A synergy occurs between the elastic biasing means the dismantleable charniers due to the fact that it is the powerful elastic biasing mechanism that later locks the assembly in addition to performing its usual functions of snap fitting and pivoting apart of the side arm. This avoids the necessity of having to deform components (the side arms, eyelets etc.) that are normally designed to be rigid in order to support mechanical stresses.

The periphery of either or both eyelets has a first cam to provide the elastic action between the open and closed positions of the side arms, and a second cam to provide the elastic action beyond the open position.

According to a first embodiment, a passageway at least as big as the rod, and directed facing the bearing surface, is provided in one of the female charnier's two eyelets.

In this manner, the mode of assembly consists in maintaining the bearing surface spaced apart from the pin against the action of the elastic biasing means, then inserting the pin in the eyelet by introducing the rod in the passageway until this rod is brought into the inter-eyelet interstice, then releasing the bearing surface.

This configuration is so relatively easy to understand that anybody can assemble and dismantle such a hinge. Moreover, the bearing surface is under pressure and generates frictional forces in contact with the female charnier, which prevents the pin from accidentally dropping out of the passageway.

If required, the male charnier's rod can thus have a cylindrical or polygonal cross-section with rounded edges such that if the rod tends to move out of the female charnier's passageway when the side arm is pivoted, it is immediately brought back into the interstice as the arm continues its movement.

According to a second embodiment, the inter-eyelet interstice is at least as big as the pin's diameter and as the largest cross-sectional dimension of the rod. Moreover, a passageway directed facing away from the bearing surface, and at least as big as the pin's diameter, is provided in each of the female charnier's two eyelets. Advantageously, in this case, the male charnier's rod has a cylindrical or polygonal cross-section with rounded edges such that it can freely turn about itself in the middle of the interstice.

The manner of assembling such a hinge consists in maintaining the bearing surface spaced apart from the pin against the action of the elastic biasing means, inserting the pin then the rod in the female charnier's interstice until this pin passes through to the other side of the female charnier, then turning the pin/rod by a quarter of a turn to insert it in the opposing passageways, then releasing the bearing surface.

This hinge is particularly reliable due to the fact that the passageways for inserting the pin into the female charnier are oriented facing the side opposite that which comes to contact the bearing surface, which eliminates any risk of unwanted disassembly.

Preferably, the bearing surface comprises a protruding tenon than is inserted in the female charnier's inter-eyelet interstice. This tenon precisely positions the bearing surface relative to the female charnier, thereby preventing any anesthetic offsetting. More importantly, this tenon provides a simple and effective locking of the assembled hinge, in particular for the first embodiment wherein it prevents the rod from moving up in the passageway.

Preferably, there is a wall closing the inter-eyelet interstice level with the position of the rod that corresponds to the maximum desired position of the side arm beyond its open position. This wall also rigidities the inter-eyelet interstice.

When the elastic biasing mechanism is of the "slide" or "rod" type, the bearing surface is constituted of the edges of the housing's mouth, and the rear part of this housing is open to allow the rear end of the slide or the rod to appear. Hence, it is possible, by means of a tool such as a pin extractor, to push against the slide's or the rod's rear part to extract the male charnier, i.e. to separate the male charnier's pin from the housing's mouth in order to assemble the hinge.

Preferably, the elastic biasing mechanism is of the "sheath" type, i.e. comprising a sheath whose front face constitutes the bearing surface. This sheath slides on a rigid rod/arm because it is made in one piece, and it is urged against the cam-shaped female charnier by a spring also concentric to the arm supported at the rear by an abutment such as a crimped ring on the arm.

A first inherent advantage of this type of hinge is its simplicity in that its mechanism is essentially composed of only three simple components, each easy to manufacture or available on the market, and easy to assemble. Moreover, this mechanism may be of mall volume when made of metal, with or without a decorative and protective cover for the spring.

Above all, in practice, it is much easier to rearwardly pull a sheath against spring action than to forwardly push a slide or rod as when assembling the first embodiment. Assembly of the second embodiment is further facilitated in that, because the sheath bears against the female charnier, it suffice to push against the arm to make the pin pass through the interstice and, still acting on the arm, to turn the pin by a quarter of a turn and engage it in its seat in the female charnier.

The invention will be better understood from the embodiments given by way of non-limiting example and illustrated in the accompanying drawings, wherein:

DETAILED DESCRIPTION OF THE INVENTION

Figure 1:
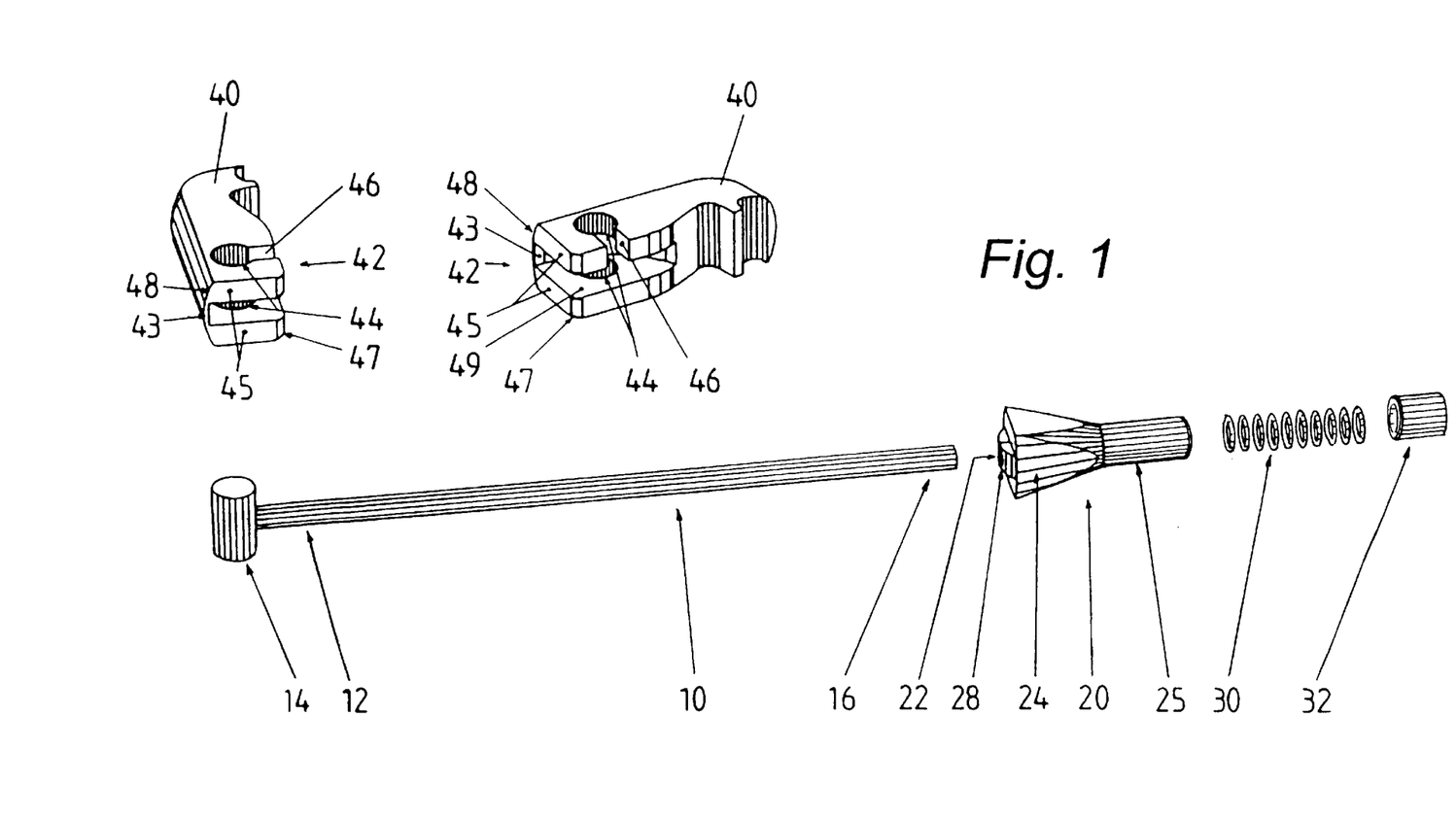
FIG. 1 is a perspective view of the various components of a first embodiment of a dismountable hinge.

In the lower part of FIG. 1 is illustrated on the left side an arm 10 of a pair of spectacles, and on the right side the pieces constituting an elastic biasing mechanism.

For instance, the arm 10 is based on a 11 to 12 cm long rod, with a diameter between 0.5 and 2 mm, and with a rear end 16 which is to be bent downward to fit the ear of the bearer. The shape of the cross section of this rod can be any suitable shape, but is preferably circular or polygonal (square, octagonal . . . ) with rounded edges. The other end of the rod 12 bears a transverse connecting hinge pin 14 to form a male charnier reduced to its simplest possible form. The diameter of this axis can be smaller, equal to, but preferably greater than that of the arm rod by being comprised between 1 and 2 mm. The height of this hinge pin 14 is in the order of 3 mm, i.e. two portions jut out upward and downward by approximately 1 mm from the rod. This hinge pin can be welded on, or can be directly stamped in the material forming the end of the rod 12.

As illustrated, the elastic biasing mechanism of the "sheath" type is composed of only three pieces, i.e. a sheath 20 sliding along the arm/rod, a spring 30 and a ring 32 successively threaded on the arm/rod 10.

The sheath 20 includes an inner duct 22 whose cross sectional shape and dimensions are substantially identical to those of the arm/rod 10. In the illustrated case, the rear part 25 of the sheath is cylindrical, but can also extend as a cylindrical envelope going over the spring 30 and partly over the ring 32. The posterior part 24 forms an enlargement to create a vertical frontal bearing surface 26 substantially orthogonal to the arm/rod. According to the desired aesthetics, this part 24 can be either conical, or pyramidal or parallelepipedic forming in the latter case a well visible set-back protrudes relative to the smaller rear part. More particularly, according to the invention, a horizontal tenon 28 with rounded outer edges protudes from the bearing surface 26.

The spring 30 can be formed of a plurality of soft elastomer rings, but preferably is a commercially available steel helicoidal spring. The ring 32 can be simply cylindrical as illustrated but can also have other external shapes (arched, indented . . . ) as aesthetically desired. This ring 32 can also be constituted of a colored envelope covering the most part of the length of the arm/rod 10. Alternatively, this ring 32 can also be extended forward with a decorative cylindrical envelope covering the spring 30 and a part of the rear 25 of the sheath 20.

In the upper part of FIG. 1 is illustrated, along two different view angles, the front part's tenon 40 ending in a female hinge 42 especially adapted for the male charnier 12/14 of the invention. The front part's tenon 40 is made solid with the sides of the lens support, for example by being a part of the rim clamp barrels.

Conventionally, the female charnier 42 is made of two eyelets 45 separated by an interstice 49, whereby the alignment of the openings of both eyelets facing each other form a cylindrical seat 44 for the hinge pin 14.

More specifically to the invention, one of the eyelets, in this instance the upper eyelet, presents a radial passageway 46 oriented in the direction of the arm 10 when it is in the closed position. This radial passageway 46 is at least as wide as the arm 10.

The identical external periphery for both eyelets 45 is substantially rectangular with rounded edges forming two cams: a first cam 47 to provide the elastic "snap" action between the open and closed positions of the side arms, and a second cam 48 to provide the elastic action beyond the open position.

Preferably, a wall 42 links both eyelets 45 to rigidity and thus better maintain the height of the interstice 49. Moreover, the end of this wall 43 marks the extreme position of the arm in the wide open position, the extremity 12 of the rod touching this wall.

The mode of assembly and of disassembly of this hinge will be better understood referring to FIGS. 2.

Figure 2A:
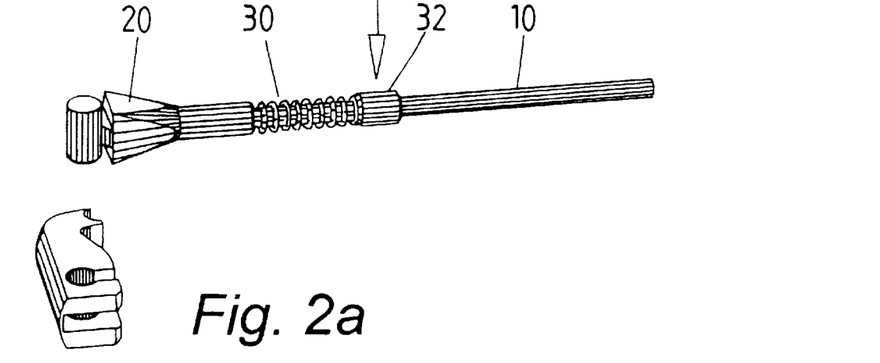
FIGS. 2a, 2b, 2c and 2d are perspective views of the mode of assembly of the hinge according to FIG. 1, FIGS. 3a, 3b, and 3c are perspective views of the hinge according to FIG. 1 with the arm respectively in closed, open, and beyond open positions.

On FIG. 2a is illustrated how the sheath 20, the spring 30 and the ring 32 have first been threaded on the arm/rod 10. Depending on the rigidity of the spring, it is or is not slightly compressed before the ring 32 is mounted on the arm 1 when it is in contact with the back end of this spring.

Figure 2B:
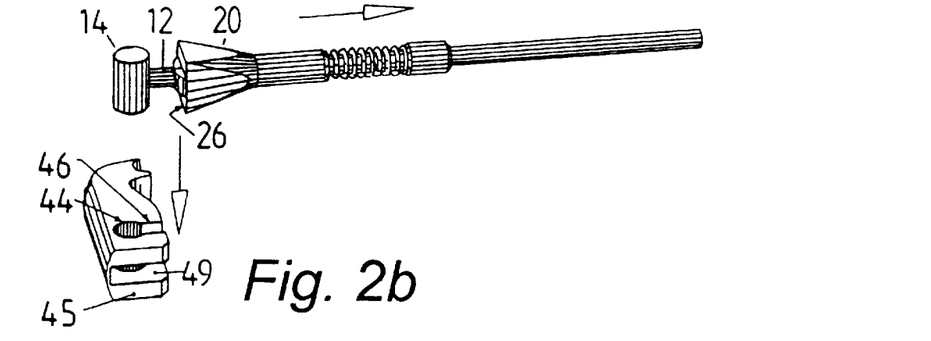

On FIG. 2b is illustrated how the sheath 20 is pulled back by compressing the spring, which allows the hinge pin 14 to prominently stand out from the bearing surface 26 of the sheath which has thus moved in a parallel direction to the rod 10. This pin 14 can then be introduced in the entry of the seat 44 of the female charnier 42 and, when it is slid downwards, the extremity 12 of the rod is simultaneously introduced into the passageway 46. This downward movement is completed when the extremity 12 reaches the lower eyelet 45, so that the rod is in the interstice 49.

Figure 2C:
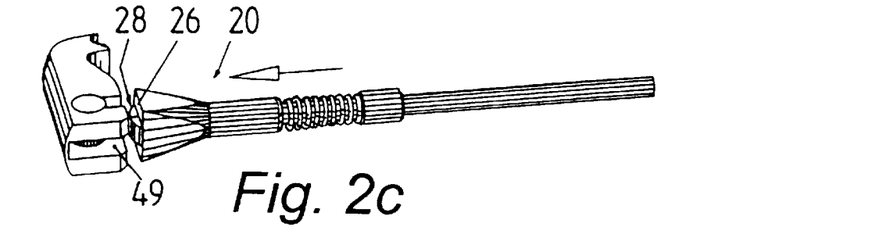

At this moment, as well illustrated in FIG. 2c, the freeing of the sheath 20 allows the prominent tenon 28 to engage into the interstice 49 and the remaining active parts of the bearing surface 26, i.e. those facing the prominent portions of the pin 14, come into contact under pressure against the periphery of the eyelets 45.

Figure 2D:
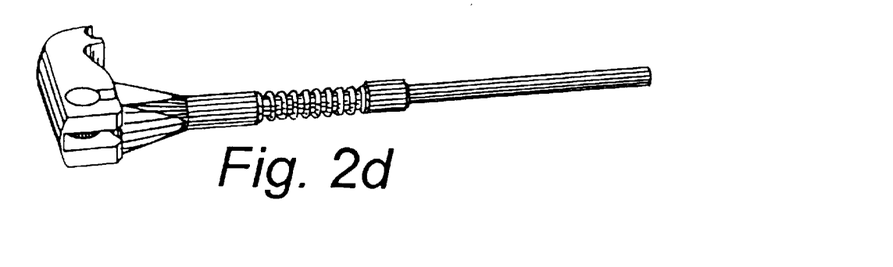

As well visible on FIG. 2d, the spring 30 exerts a pressure an the sheath 20 which ensures the bearing of the tenon 28 in the interstice 49, thus efficiently locking the assembled hinge. It should be noted that, even without a tenon, the pressure of the spring provokes friction forces at the level of the bearing surface 26 making very unlikely for the pin 14 to be lifted from its seat 44 precisely at the moment when the extremity of the arm 12 is facing the passageway 46. Furthermore, if such should be the case during the rotation of the arm/rod, the cylindrical shape of the section allows it to be folded back immediately in this interstice.

Figure 3A:
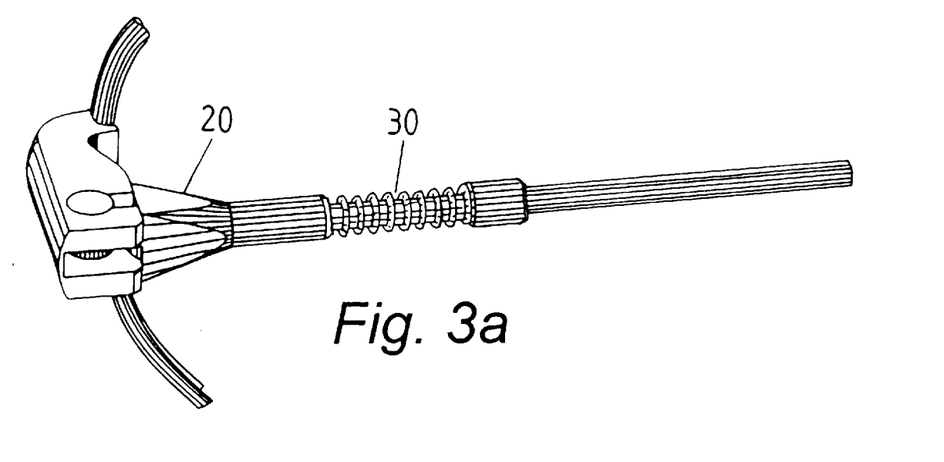
Figure 3B:
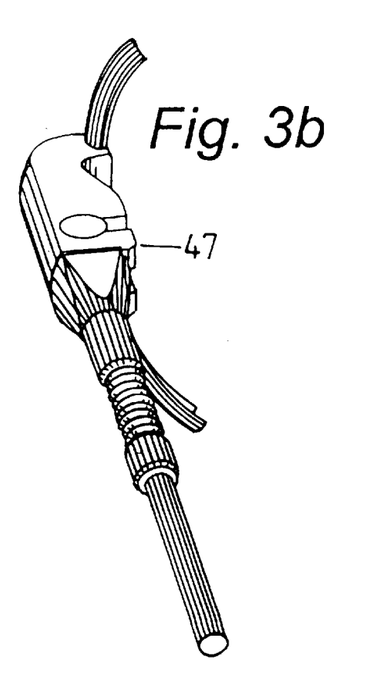
Figure 3C:
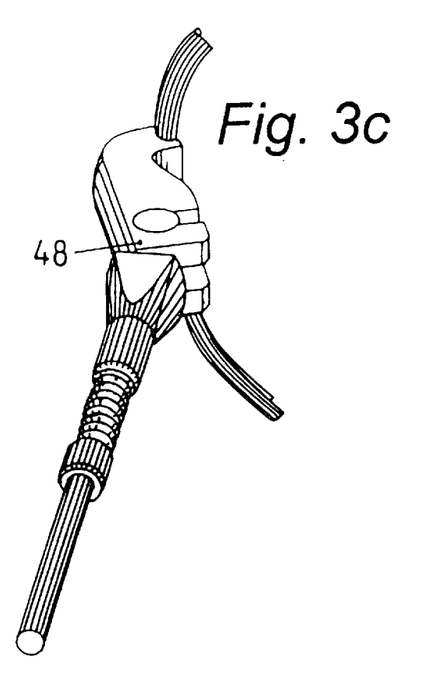

FIG. 3*a* illustrates the arm in closed position in which the bearing surface of the sheath bears on one of the rectilinear sides of the periphery of the charnier. During the transition of the arm 10 from the position of FIG. 3*a* to the "open" position as illustrated on FIG. 3*b*, the cam 47 imparts a withdrawal of the sheath 20 along the rod compressing the spring 30 which slackens when the bearing surface of the sheath comes back into contact with the second rectilinear side of the periphery of the female charnier 42. If the arm is opened beyond the open position as illustrated in FIG. 3*c*, then the second cam 48 forces withdrawal of the sheath once again by compressing the spring 30, tending to bring back the arm into the neutral position of FIG. 3*b*.

Figure 4:
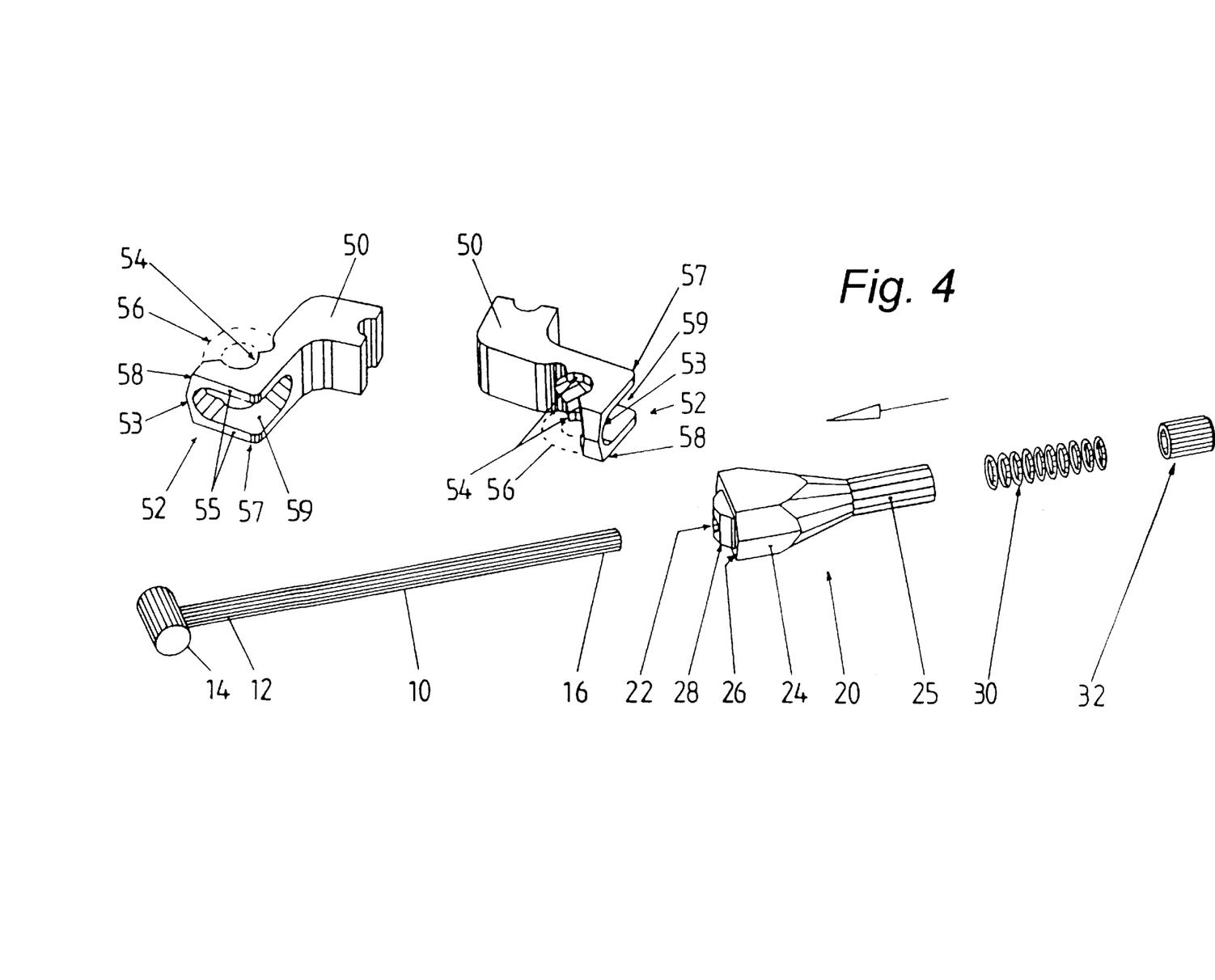
FIG. 4 is a perspective view of the various components of a second embodiment of a dismountable hinge.

On FIG. 4, a second embodiment of a dismountable hinge according to the invention is illustrated. Particularly, in this embodiment, the arm 10, the elastic biasing mechanism 20/30/32 and the male charnier 12/14 are rigorously identical to those described previously in relation to FIG. 1, and the corresponding components and parts have identical reference numbers.

This embodiment differs considerably in regards to the structure of the female charnier 52 machined at the extremity of the front part's tenon 50. As previously, the female charnier 52 comprises two eyelets 55 whose vertically aligned facing central openings form the pin's seat 54. However, in this embodiment, the pin's seat 54 is reachable from the back by the presence of forwardly oriented radial passageways 56 i.e. in the opposite direction to the arm 10. Furthermore, the interstice 59 between the eyelets 55 is wider, i.e. as wide as the diameter of the hinge pin 14.

The presence of the back passageways 56 gives to the periphery of the illustrated eyelets an almost triangular shape with two rectilinear edges separated by a rounded angle forming a first cam 57 acting during the transition of the arm from the closed to the open position. This periphery has a second end cam 58 bordered by an abutment wall 53 closing and reinforcing the interstice 59, this cam 58 acting while the arm is opened beyond the open position.

The mode of assembly of this second hinge will be better understood referring to FIGS. 5.

Figure 5A:
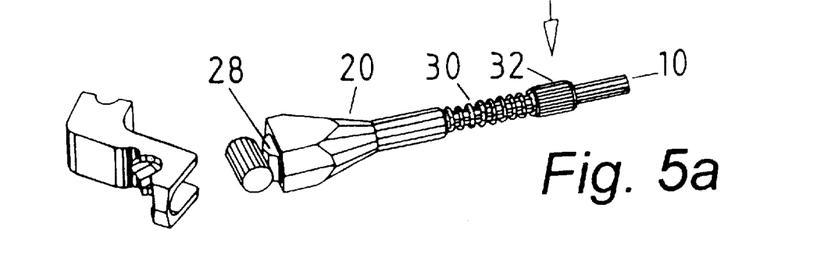
FIGS. 5a, 5b, 5c, 5d, 5e and 5f are perspective views of the mode of assembly of the hinge according to FIG. 7, FIGS. 6a, 6b, and 6c are perspective views of the hinge according to FIG. 4 with the arm respectively in closed, open, and beyond open positions.

On FIG. 5*a* is illustrated how the sheath 20, the spring 30 and the ring 32 have been threaded on the arm/rod 10. As previously, the ring 32 is mounted on this rod, possible with the spring in slight pre-compression. In this case however, the hinge pin 14 is aligned parallel to the tenon 28 of sheath 20.

Figure 5B:
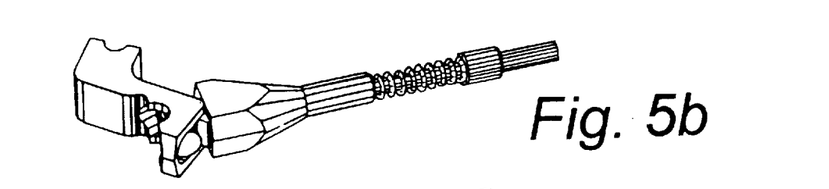
Figure 5C:
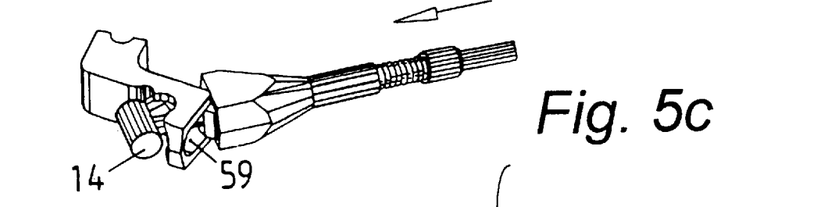
Figure 5D:
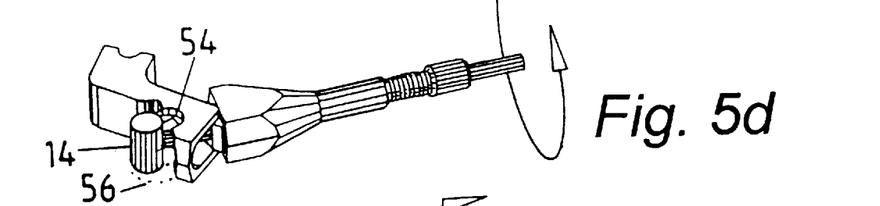
Figure 5E:
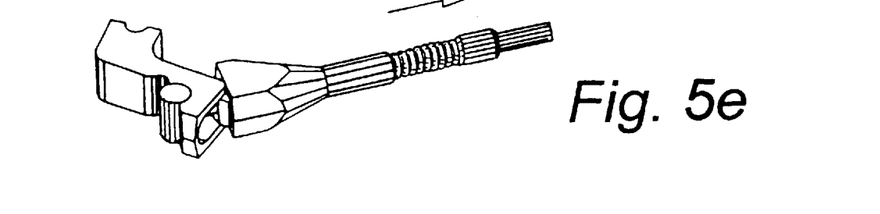
Figure 5F:
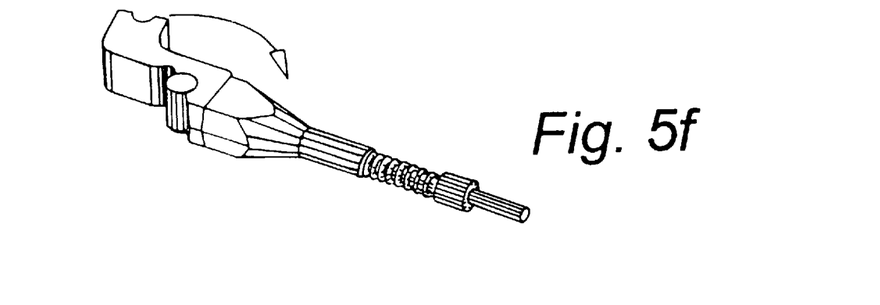

As well visible on FIG. 5*b*, the hinge pin 14 can be inserted into the interstice 59, then, as illustrated on FIG. 5*c*, the hinge pin can be pushed through the female charnier by pushing the arm 10, the female charnier forcing then a sliding of the sheath 20 compressing the spring 30. In this situation, the arm can be rotated by a quadrant as illustrated in FIG. 5*d*, which realigns the hinge pin 14 relative to the rear passageway 56 allowing then, by releasing the arm which retracts under the effect of the spring, the hinge pin to be installed in its seat 54 as well visible on FIG. 5*e*. The final expansion of the spring 30 tends to bring the arm in one of the two rest positions, for example the open position as illustrated in FIG. 5*f*.

Figure 6A:
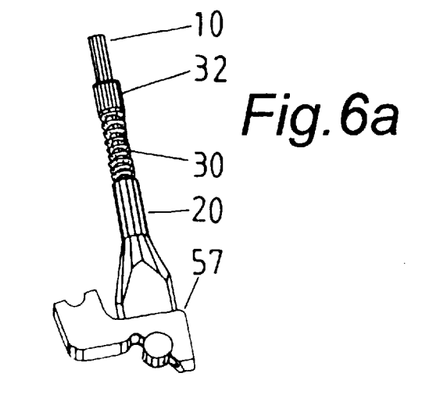
Figure 6B:
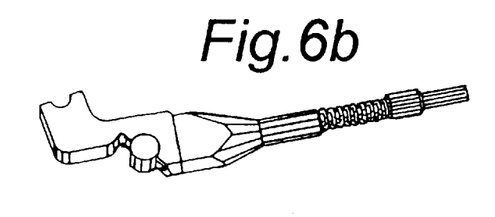
Figure 6C:
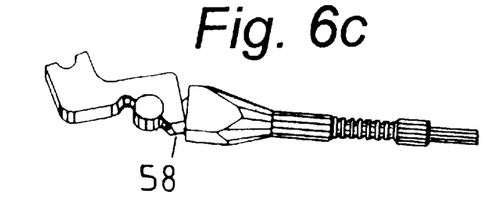

FIG. 6*a* illustrates this second hinge with the arm in closed position. During the transition of the arm to the open position, as illustrated in FIG. 6*b*, the cam 57 forces a withdrawal of the sheath 20 along the arm/rod 10 by momentarily compressing the spring 30. FIG. 6*c* illustrates how, when the arm is solicited beyond the open position, the second cam 58 forces again a withdrawal of the sheath by the spring.

Figure 7A:
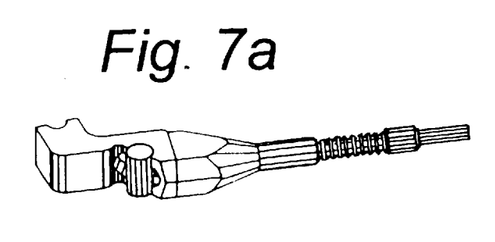
FIGS. 7a, 7b, and 7c are perspective views of the hinge according to FIG. 4 with the arm respectively in neutral horizontal, in oblique upward position and in oblique downward position.
Figure 7B:
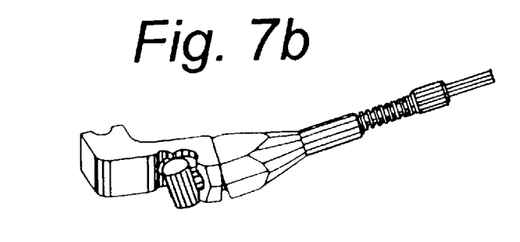
Figure 7C:
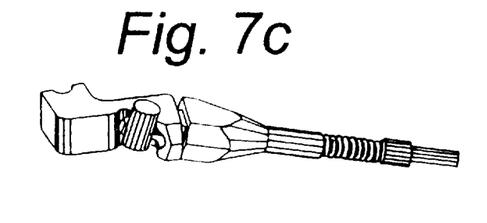

FIGS. 7 illustrate a remarkable advantage of this second embodiment of hinge, i.e that this hinge also allows the flexion of the arm in a vertical plane perpendicular to the vertical plane of the spectacle frame front. FIG. 7*a* illustrates sideways the open arm in a neutral horizontal position.

FIG. 7*b* illustrates how this second hinge allows an oblique elastic orientation of the arm upwards, which brings an appreciated comfort for a person having a morphology in which the top of the nose is noticeably lower than the ears. In this case, the lower portion of the hinge pin takes a bears on its seat, the external periphery of the upper eyelet pushes slightly the sheath backwards, compressing the spring 30. This correction is thus controlled by the rigidity of the spring. FIG. 7*c* illustrates the inverse correction, i.e. when the arm is bent downwards. In this case, the periphery of the lower eyelet pushes the sheath backward, the lower portion of the hinge pin leaving its seat, the upper portion remaining in support.

The invention is not strictly limited to the examples of the embodiments described as long as many improvements can be brought to the hinge within the scope of the claims. In fact, it is possible to envisage the use of female charniers 42,52 according to the invention with elastic mechanisms of "rod" or "slide" type as long as the envelopes are open to the back. Indeed, thanks to the back opening of the envelopes, the rear part of the rods or slides can be accessed to be pushed with a tool and make the male charnier, also reduced to a solid pin on the extremity of a rod, noticeably prominent from a bearing surface constituted, in this instance, by the walls of the front mouth of the casing.

Another advantage of this dismountable hinge according to the invention is that all constituents, except the spring, can be realized in a rigid material, for example moulded thermohardening plastics. However, as the component parts are relatively simple structures, they are preferably machined from metal to obtain very small hinges, therefore very aesthetic, the presence of the spring absorbing shocks, reducing wear, and strongly increasing long term reliability.

Considering that the assembly modes described relating to FIGS. 2 and 5 are easily understandable, it is envisaged that a user buys a plurality of pairs of arms with a spectacle frame, each pair having a different colour or different spring protection case shapes. The user can thus change daily the aesthetic appearance of his spectacles according to his whims.

What is claimed is:

1. An elastic spectacle frame hinge comprising: a male charnier comprising a rod having one end attached to a middle part of a transverse connecting hinge pin, a bearing surface facing at least a portion of the hinge pin protruding from the rod, an elastic biasing mechanism for biasing the hinge pin and the bearing surface wherein the hinge pin and the bearing surface are normally biased towards one another in a longitudinal direction of the rod and are selectively movable apart from one another against action of the elastic biasing mechanism; and, a female charnier comprising eyelets having a periphery forming a double cam against which the bearing surface comes to bear, and an interstice between the eyelets wherein the interstice defines a distance between the eyelets which is at least equal to a cross-sectional dimension of the rod, wherein at least one of the eyelets comprises a radial passageway; and wherein the bearing surface comprises a protruding tenon inserted in the interstice between the eyelets of the female charnier.

2. The elastic spectacle frame hinge according to claim 1, wherein the passageway has a dimension at least equal to a cross-sectional dimension of the rod facing the bearing surface in one of the eyelets of the female charnier.

3. The elastic spectacle frame hinge according to claim 2, wherein the bearing surface comprises a protruding tenon inserted in the interstice between the eyelets of the female charnier.

4. The elastic spectacle frame hinge according to claim 2, comprising a wall closing the interstice between the eyelets level with the a position of the rod that corresponds to a maximum desired position of a side arm of the spectacle frame beyond an open position.

5. The elastic spectacle frame hinge according to claim 2, wherein the elastic biasing mechanism comprises a sheath comprising a front face comprising the bearing surface, said sheath being slidable on the rod, and a spring concentric to the rod supported at a rear position by an abutment on the rod.

6. The elastic spectacle frame hinge according to claim 1, wherein the interstice defines a distance between the eyelets which is at least equal to a diameter of the hinge pin and a cross-sectional dimension of the rod, and wherein the passageway is oriented facing away from the bearing surface and has a dimension at least equal to a diameter of the pin.

7. The elastic spectacle frame hinge according to claim 3, wherein the passageway is provided in each of the eyelets of the female charnier.

8. The elastic spectacle frame hinge according to claim 7, wherein the bearing surface comprises a protruding tenon inserted in the interstice between the eyelets of the female charnier.

9. The elastic spectacle frame hinge according to claim 7, comprising a wall closing the interstice between the eyelets level with the a position of the rod that corresponds to a maximum desired position of a side arm of the spectacle frame beyond an open position.

10. The elastic spectacle frame hinge according to claim 7, wherein the elastic biasing mechanism comprises a sheath comprising a front face comprising the bearing surface, said sheath being slidable on the rod, and a spring concentric to the rod supported at a rear position by an abutment on the rod.

11. The elastic spectacle frame hinge according to claim 6, wherein the bearing surface comprises a protruding tenon inserted in the interstice between the eyelets of the female charnier.

12. The elastic spectacle frame hinge according to claim 6, comprising a wall closing the interstice between the eyelets level with the a position of the rod that corresponds to a maximum desired position of a side arm of the spectacle frame beyond an open position.

13. The elastic spectacle frame hinge according to claim 6, wherein the elastic biasing mechanism comprises a sheath comprising a front face comprising the bearing surface, said sheath being slidable on the rod, and a spring concentric to the rod supported at a rear position by an abutment on the rod.

14. The elastic spectacle frame hinge according to claim 1, comprising a wall closing the interstice between the eyelets level with a position of the rod that corresponds to a maximum desired position of a side arm of the spectacle frame beyond an open position.

15. The elastic spectacle frame hinge according to claim 14, wherein the elastic biasing mechanism comprises a sheath comprising a front face comprising the bearing surface, said sheath being slidable on the rod, and a spring concentric to the rod supported at a rear position by an abutment on the rod.

16. The elastic spectacle frame hinge according to claim 1, wherein the elastic biasing mechanism comprises a sheath comprising a front face comprising the bearing surface, said sheath being slidable on the rod, and a spring concentric to the rod supported at a rear position by an abutment on the rod.

17. A spectacle frame comprising an elastic spectacle frame hinge interconnecting a front spectacle part for holding a lens with a side arm in a manner whereby the side arm is movable from an open position for wearing the spectacle to closed position for storage of the spectacle, said elastic frame hinge comprising: a male charnier comprising a rod having one end attached to a middle part of a transverse connecting hinge pin, a bearing surface facing at least a portion of the hinge pin protruding from the rod, an elastic biasing mechanism for biasing the hinge pin and the bearing surface wherein the hinge pin and the bearing surface are normally biased towards one another in a longitudinal direction of the rod and are selectively movable apart from one another against action of the elastic biasing mechanism; and, a female charnier comprising eyelets having a periphery forming a double cam against which the bearing surface comes to bear, and an interstice between the eyelets wherein at least one of the eyelets comprises a radial passageway and wherein the interstice defines a distance between the eyelets which is at least equal to a cross-sectional dimension of the rod.

* * * * *